United States Patent Office 2,818,605
Patented Jan. 7, 1958

2,818,605

METHOD OF MAKING A REFRACTORY MATERIAL

Herbert I. Miller, Los Alamos, N. Mex., assignor to the United States of America as represented by the United States Atomic Energy Commission No Drawing. Application June 23, 1949
Serial No. 100,963

3 Claims. (Cl. 18—55)

This invention relates to refractory materials and, more particularly, to such materials which have desired nuclear properties for employment in the field of physics.

Since the discovery of nuclear fission, the importance of neutron induced reactions in various materials has increased. It is well-known at the present time, for example, that the nuclear characteristics of certain materials make them extremely desirable for use in connection with neutron emitting systems or the like and are useful generally in increasing the efficiency of such systems. Thus, in neutronic reactors such as described by Fermi and Szilard, U. S. Patent application S. N. 568,904, filed December 19, 1944, now Patent No. 2,708,656, dated May 17, 1955, it has been found that beryllium or compounds thereof, such as, beryllium oxide, are extremely useful as neutron reflecting materials employed outwardly of the neutronic system to return to the system many of the neutrons which would otherwise escape therefrom. The scattering cross-section of the beryllium nucleus for neutrons is known to be very large and increasingly so as the energy of the neutrons is reduced. Furthermore, because its absorption cross-section for neutrons is extremely small, in fact negligible, beryllium being one of the light elements is ideally adapted as a neutron moderator, that is, it will slow fast neutrons down to thermal energies very rapidly. See copending U. S. patent application of Miller and Smith, S. N. 100,876, filed June 23, 1949.

It is believed useful to explain in some detail the operation of neutronic reactors or other neutron multiplying systems as a background for the present invention. It is well-known that certain elements, when subjected to neutron bombardment, split or fission into two parts, i. e., into two elements having a lower atomic number and weight. This fission process is accompanied by the emission of various types of radiation and nuclear particles. As a result of the fission of the original nucleus, the new elements or fission products possess an extremely high velocity which may be expressed in terms of the kinetic energy thereof now known to be in the neighborhood of 160 million electron volts. Furthermore, the energy of the radiation emitted in the process is in the neighborhood of 5 million electron volts. The utilization of this energy forms the basis of the neutronic reactor system.

Among the particles emitted in the fission of such elements as uranium 233, uranium 235 or plutonium 239 are at least two neutrons. It is thus seen to be possible that a self-sustaining neutron chain reaction can be established in which a fissile nucleus is bombarded by a neutron and splits and, in turn, gives off further neutrons which may be employed for bombarding further fissile nuclei and causing further fission. As explained in the above mentioned application of Fermi and Szilard, chain reactions can be maintained in systems in which normal polyisotopic uranium is employed as the reactive material. In such a system, a balance is obtained between the loss of neutrons by escape from the system or absorption in nuclei without producing fission and the gain in neutrons obtained by neutron induced fission of the uranium 235 nuclei present as about one part in 140 parts of uranium 238 in the normal polyisotopic mixture. Such a balance is more readily obtained when the neutrons emitted in fission are slowed from their normal high energy to thermal energies at which the uranium 235 fission cross-section is very large. Such self-sustaining neutronic reactors employing normal uranium generally comprise:

(1) A neutron slowing material known as a moderator, such as, graphite, in which the fissionable material is dispersed in a geometrical pattern designed to reduce neutron losses.

(2) Heat removal means, for example, channels in heat exchange relationship with the reactive mass and through which a suitable coolant is circulated in order to stabilize temperatures in the system.

(3) An outer casing sometimes called a tamper which serves to reflect neutrons back into the system and thereby reduce the quantity (i. e., the critical mass) of fissionable mixture necessary to sustain the reaction.

(4) Means for charging the reactive elements into the zone in which the reaction takes place and for removal therefrom of the products of the reaction.

(5) A protective shield is sometimes provided around the reactor to minimize the escape of biologically harmful radiations. Such shields may comprise, for example, bismuth or lead, which have been found effective in stopping gamma radiation, hydrogenous materials such as paraffin for absorbing neutrons and/or massive outer concrete casing.

(6) A monitoring system to determine the reaction conditions at all times.

(7) Control devices generally comprising neutron absorbing materials insertable into the reactive mass to maintain an average state of neutron production and adsorption balance at a predetermined level.

(8) The safety devices comprising a quantity of neutron absorbing material which may be used to stop the reaction in case of emergency by being automatically inserted into neutronic absorbing relationship with the reacting mass.

Large size reactors have been constructed in accordance with the above and it has been found that components 2 and 4 in the above list raise difficult problems in the construction. The temperatures created in the generation of the many kilowatts of power produced in such reactors are extremely high and intricate construction design features have been necessary to prevent distortion of the system or any of the component elements thereof. Furthermore, in order to prevent temperatures beyond the limits of the structural materials employed, coolants have been introduced which create corrosion problems, contamination removal difficulties and the like. Furthermore, the problem of charging such a reactor is one of major consideration, because of the lattice structure necessary when polyisotopic uranium is employed in the manner described.

Robert Christy in U. S. patent application S. N. 623,363, filed December 12, 1944, has described a reactor in which the fissile material is employed in the enriched state, for example, the percentage of uranium 235 is increased to 30% instead of the 0.7% in normal uranium. This reactor may be made quite small, e. g., the fissile material therein occupying a zone about 12 inches in diameter. In the embodiment described, the fissile material is employed in an aqueous solution, the hydrogen nuclei in the solution acting as the moderator to thermalize the neutrons. Obviously, such a device must operate below the boiling point of the reactive solution thus limiting the power output. Furthermore, the desirable soluble fissile material compounds, e. g., uranyl nitrate, form corrosive solutions which raise a number of problems in the construction and operational maintenance of the device.

It should also be noted that neutron multiplying systems may be constructed which do not operate in a self-sustaining manner. For example, the prior art has disclosed a multiplying system in which neutrons from an external source are allegedly multiplied in a subcritical quantity of fissile material. It is now well-known that a primary neutron introduced into a subcritical system will be multiplied to a degree proportional to the ratio of the mass of fissile material present to the critical mass value, and this relationship is employed in establishing the critical mass value for various fissile materials.

It is an object of the present invention to provide a novel reactive composition for use in neutron multiplying systems and reactors such as described above.

It is a further object of the present invention to provide reactive mixtures of fissile materials and moderating materials capable of withstanding extremely high temperatures and methods for making the same.

It is a still further object of the present invention to provide arrangements of fissile materials and moderating materials which have superior heat transfer characteristics.

Another object of the present invention is to provide a new article of manufacture and methods for making the same, the said article being ideally suited for employment in neutron multiplying systems by reason of its elimination of corrosion problems heretofore encountered in such systems.

Still another object of the present invention is to provide a refractory mixture of a fissile material and a moderator material.

Other objects will become apparent to one skilled in the art from the following description taken together with the illustrative examples which are given by way of explanation and should not be deemed to be limitations on the scope hereof.

The above mentioned objects are attained according to the present invention by intimately mixing powdered oxides of a fissile material and a moderating material, pressing the said mixed oxides into subcritical masses of predetermined shape and density, and heating the said masses above the sintering temperature thereof. The resultant product is a coherent refractory arrangement or brick of fissile nuclei substantially uniformly dispersed among moderating nuclei, the percentage of fissile nuclei present being predetermined to permit the employment of the pre-formed brick either by itself or in combination with other blocks (either of similar composition or size, or not) or with neutron reflectors, absorbent shields or the like. Furthermore, by control of the composition according to fixed rules or otherwise, or according to predetermined zones, circulation of coolants through the refractory brick may be permitted or, alternatively, the heat conductivity of the brick provided for in a predetermined manner.

The fissile materials and other heavy metals of the second rare earth series found useful in the present invention include uranium in its polyisotopic form or the separated isotopes of uranium, such as, uranium 233 or uranium 235, thorium and protactinium; the transuranic elements, neptunium, plutonium, americium and curium or isotopes thereof. These materials likewise may be admixed in predetermined quantities for particular types of neutronic systems or employed in highly purified states. The separated isotopes of these materials may be readily obtained. For example, uranium 235 may be separated from uranium 238 in mass separating devices such as described by Robert R. Wilson in U. S. patent application S. N. 653,518, filed March 11, 1946, now Patent No. 2,606,291, granted August 8, 1952. Another method of separating the uranium 235 isotope from the naturally occurring isotopic mixture is by gas diffusion methods employing uranium hexafluoride gas and diffusion barriers.

In both methods, the separation is not completed in a single stage, but rather proceeds step-wise, or in cascade fashion, with the accepted portion of each step being further separated and the rejected portion being re-cycled. It will thus be seen that the fissionable isotope uranium 235 is observed to occur in greater abundance or concentration with each advancing step of the process, and the accepted portion of each step may be used in the practice of the present invention.

Uranium 233 may be formed by subjecting a quantity of thorium 232 to neutron bombardment, the resulting reaction being as follows:

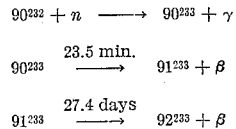

If desired, the uranium 233 can be separated from the thorium parent by chemical methods, but as will be seen from the discussion herein, this separation is not necessary if the concentration of the uranium 233 isotope is sufficiently high for the desired purposes.

Plutonium 239 is formed by slow neutron bombardment of uranium 238, the chain being:

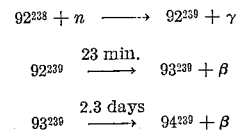

The higher transuranic elements may be formed by well-known transformation procedures.

It is preferred in the practice of the invention to employ the fissionable materials mentioned in the oxide form as this form has been found to possess the characteristics which make it a preferred refractory material. The process for production of the oxides of these materials is now well-known and will not be discussed in detail herein. Furthermore, the manner of preparation of the oxides in predetermined particle sizes is also well-known at the present time.

The preferred moderating materials employed in the invention must also possess refractory characteristics. For this purpose, beryllium oxide has been found most desirable. The presence of oxygen nuclei does not impair the moderating action of the material. For example, at thermal energies, the neutron cross-sections in units of $10^{-24}$ cm.$^2$ of beryllium are, absorption 0.0085, scattering 6.1; for oxygen, absorption 0.0016 and scattering 4.1.

It should be noted that when pure fissile isotopes, such as, uranium 233 or uranium 235, or compositions including such isotopes enriched with respect to other elements or isotopes are employed together with moderating materials, small quantities of the said fissile material may produce a critical assembly and care must be taken to prevent this result through inadvertence or mistake. As a consequence, it is generally preferred to prepare the masses or bricks in relatively small sizes when pure fissile materials or enriched fissile materials are utilized.

Many of the possible variations in the articles, compositions and methods which form the present invention will be apparent from the following examples which also serve to indicate that the product formed by the practice of the present invention are largely defined by specific steps in the process described.

*Example 1*

Minus 200 mesh particle size high fired beryllium oxide powder of normal commercial manufacture was intimately mixed in a standard mixer with uranium oxide having the composition $UO_2$. The mixture comprised 95% beryllium oxide and 5% uranium oxide, the uranium in this case being the normal isotopic mixture. After mixing for approximately 50 hours, water was added to the resultant mixed powder in a quantity sufficient to form a stiff paste. Portions of the paste were then incorporated into a cylindrical die which permitted the application of a compressive force thereto and the elimination of part of the water from the compacts, the compacting method employed being substantially that described in U. S. Patent 1,993,047 to Westman. The compacts were extruded from the die and dried in air for 24 hours. Firing was accomplished in a high temperature furnace to which air was admitted and said firing was performed in accordance with a predetermined schedule. The temperature was first raised from room temperature to a temperature of 1000° C. over a period of 30 minutes. At 1000° C., the temperature was maintained constant for 1 hour. Thereafter, the temperature was raised as rapidly as possible to 1750° C. and maintained at that point for 3 hours. Upon the completion of this period, the current was turned off and the furnace permitted to cool to room temperature and the finished bricks removed. After this treatment, the bricks were found to possess a highly vitrified fine crystal structure and in compression tests were found to have a crushing strength upward of 70,000 lbs. per square inch. Analysis indicated substantially uniform dispersion of uranium nuclei among the beryllium nuclei.

*Example 2*

Beryllium oxide of standard commercial manufacture and of minus 200 mesh particle size was intimately mixed with uranium oxide in the form $U_3O_8$. The proportions of the mixture were 98% beryllium oxide and 2% uranium oxide by weight. The uranium oxide employed was enriched in the isotope uranium 235 so that the said isotope was about 30% of the uranium present. The total weight of the batch was approximately 25 grams. The subsequent steps followed those described in Example 1.

The resulting bricks were found to have a density of about 2.6 and were highly vitrified and coherent, the crushing strength being upward of 70,000 lbs. per square inch and tensile strength in the neighborhood of 12,000 lbs. per square inch. Subsequently, bricks of this composition were heated to about 1300° C. for a period upward of 100 hours in order to determine whether any density change occurred through prolonged heating such as would be encountered in a neutronic reactor. It was found that a reduction in density of about 2% resulted. Analysis of the sample thereafter showed substantially uniform dispersions of the uranium nuclei among the beryllium nuclei.

*Example 3*

Beryllium oxide and thorium oxide in powder form of standard commercial manufacture were intimately mixed in a mixer for a period of about 50 hours. The mixture comprised 98% beryllium oxide and 2% thorium oxide by weight. 25 gram portions of the said mixture of minus 200 mesh particle size was immersed in a solution of paraffin and naphtha. The excess liquid was poured off and the balance evaporated by warming the resultant sludge over boiling water. After evaporation, the mixture was passed through a 150 mesh sieve and thereupon compacted in a cylindrical compacting die under a pressure of 20,000 lbs. per square inch. Upon removal from the die, the compacts were heated in a muffle furnace to about 450° C. to drive off the paraffin. Thereafter, the temperature was raised to about 1850° C. as rapidly as possible and held for 3 hours. The furnace was then permitted to cool to room temperature and the finished brick removed therefrom. Analysis indicated that substantially uniform dispersion of the thorium nuclei and the beryllium nuclei was obtained. The bricks in general were highly vitrified and coherent. Upon breaking, they were found to possess a fine crystalline structure. One such brick was irradiated in a neutronic reactor for about 100 hours being subjected therein to a flux of about $10^{10}$ neutrons per square centimeter per second. Subsequent checks indicated the presence of a substantial number of uranium 233 nuclei and by reason of the presence of these nuclei, which are alpha emissive, neutrons were detected in the vicinity of the brick resulting from the alpha-n reaction on the beryllium.

*Example 4*

One of the bricks produced in accordance with Example 1 was crushed in a standard crusher. 20% by weight minus 200 mesh powder and 80% by weight of particles larger than 40 mesh were incorporated in a die after being treated with paraffin as in Example 3. A pressure of 5,000 lbs. per square inch is applied in the forming process and the resultant porous compact carefully extruded from the die. This compact was fired by first raising the temperature to about 400° C. to drive off the paraffin and then subsequently raising the temperature as rapidly as possible to about 1800° C. where it was held for about 3 hours. The temperature was then reduced to room temperature at a uniform slow rate and the resultant brick removed from the furnace. While the crushing strength of this sample was low, it possessed the desirable property of permitting substantial quantities of gas or air to pass therethrough at reasonably low pressures.

*Example 5*

A cylindrical tube of beryllium oxide was fabricated in accordance with the procedures outlined in U. S. patent application Ser. No. 641,618, filed January 16, 1946 by George D. Cremer. The tube was 1 inch long, ½ inch inside diameter and 1¼ inches outside diameter. A compact was formed within the beryllium oxide tube by incorporating the tube in a close-fitting die, tamping the paste of uranium oxide and beryllium oxide mixture within the inner bore of said tube and then applying a mechanical compressive pressure through suitable plungers to said paste. The pressure employed was 10,000 lbs. per square inch. The escape of excess liquid was prevented in order to increase the radial pressures and assist in obtaining a good bond between the inner compact and its supporting beryllium oxide tube. Thereafter, the composite compact was heated in air to about 1950° C. and the temperature maintained constant for 3 hours. The furnace was then permitted to cool to room temperature and the composite brick removed therefrom. Upon examination, a good bond between the inner mixture and the outer beryllium oxide tube was found to exist, both of said components being highly vitrified and of fine crystal structure. Obviously, instead of employing a prefabricated tube of beryllium oxide, a preliminary cold compacting step would have been feasible and, in fact, would result in a better bond between the components.

From the above examples, it is apparent that a highly useful composition of matter has been produced in accordance with the principles herein set forth. Obviously, many variations in the materials employed and in the compositions by weight or atomic percent are possible depending upon the desired use of the products now made available. The temperature set forth above in the illustrative examples were predetermined for highly vitrified products capable of withstanding substantial pressures. Lower temperatures will result in reduced densities and reduced crushing strengths. It should be noted that when firing is accomplished at temperatures in excess of 1300° C., while the above mentioned characteristics are changed, none of the various bricks thus prepared showed material spalling, cracking or other deficiencies under repeated heat cycles in which the maximum temperature was 1000° C. Furthermore, temperatures as high as 2000° C. have been employed in the firing process without introducing undesirable characteristics in the finished product.

In fact, when raw compacts made as described above were heated in closed, unlined graphite molds at such temperatures (around 2000° C.), the formation of a substantial amount of beryllium carbide and uranium carbide was found to have taken place at the surface of the vitrified brick, thus resulting in a product containing beryllium oxide, beryllium carbide, uranium oxide and uranium carbide. Obviously, uranium carbide and beryllium carbide can be substituted for the oxides of these elements in making the raw compacts described in the examples, and the carbide form of either element may be mixed with the oxide of the other, or oxides and carbides of both combined, to render like results when fired.

Repeated tests in which the bricks formed as above described, were subjected to various types of radiation such as one would encounter in a neutronic reactor showed no material crystal deterioration and the transition from substantially nonfissionable isotopes to fissionable isotopes, as described in connection with Example 3, was accomplished without any detectable change in the structure or the other characteristics of the bricks.

Obviously, when such transformations take place, for example, the transformation from uranium 238 through neptunium to plutonium 239, it must be recognized that an alpha emitting isotope has been formed and that neutrons will be emitted by the constituents of the brick.

Thus, beyond producing a neutron source which would be very useful for many purposes, the methods disclosed herein provide steps in which relatively harmless materials from the radioactive standpoint may be fabricated into predetermined bodies and then made radioactive in their completed form eliminating hazardous machining steps and the like. It is thus also seen that many widely different variations and modifications will suggest themselves to one skilled in the art and that the same may be made without departing from the spirit of the scope of the invention as defined in the appended claims.

What is claimed is:

1. The process which comprises intimately mixing powders consisting essentially of a refractory oxide of a metal selected from the group consisting of thorium, uranium and plutonium and of beryllium oxide, adding paraffin to the mixed powders, compacting the mixture under pressure of 5000 p. s. i., heating the compact to drive off the paraffin and then heating in the presence of air the compact to at least the sintering temperature to form a unitary structurally strong compact.

2. The process of claim 1 in which the metal oxide is uranium oxide.

3. The process of claim 1 in which the metal oxide is thorium oxide.

References Cited in the file of this patent

UNITED STATES PATENTS

| | | |
|---|---|---|
| 873,568 | Magoon | Dec. 10, 1907 |
| 1,430,724 | D'Adrian | Oct. 3, 1922 |
| 2,200,258 | Boyer | May 14, 1940 |
| 2,205,308 | Pirani | June 18, 1940 |
| 2,448,479 | Wilhelm et al. | Aug. 31, 1948 |

FOREIGN PATENTS

| | | |
|---|---|---|
| 173,237 | Great Britain | Mar. 21, 1923 |
| 114,150 | Australia | May 2, 1940 |
| 114,151 | Australia | May 3, 1940 |
| 861,390 | France | Oct. 28, 1940 |
| 233,011 | Switzerland | Oct. 2, 1944 |

OTHER REFERENCES

Webster's New International Dictionary, p. 433, G. & C. Merriam Co., Springfield, Mass. (1929).

Roberts et al.: "Uranium and Atomic Power," J. Applied Physics, vol. 10, pp. 612–614, September 1939.

Chemical Abstracts, p. 7734 (1940), abst. of Zel'dovich and Khariton article in J. Exptl. Theoret. Phys. (U. S. S. R.) 10, 29–36 (1940).

Hopkins: "Chapters in the Chemistry of the Less Familiar Elements," vol. II, page 7, Stipes Pub. Co. (1939).

Hackh's Chemical Dictionary, 3rd ed., page 775, Blakiston (1944).

Goodman "The Science & Eng. of Nuclear Power," vol. I, pp. 302 and 303, Addison-Wesley Press (1947), Cambridge, Mass., pp. 325 and 326.

Powder Metallurgy by Paul Schwarzkopf, New York, McMillan Co. (1947), pp. 44, 207, 208.

Kelly et al., Phy. Rev. 73, 1135–9 (1948).